United States Patent
Beadle et al.

(10) Patent No.: US 6,941,552 B1
(45) Date of Patent: Sep. 6, 2005

(54) METHOD AND APPARATUS TO RETAIN APPLET SECURITY PRIVILEGES OUTSIDE OF THE JAVA VIRTUAL MACHINE

(75) Inventors: Bruce Anthony Beadle, Round Rock, TX (US); Michael Wayne Brown, Georgetown, TX (US); Leonard Robert Nizinski, Jr., Austin, TX (US); Douglas S. Rothert, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/126,683

(22) Filed: Jul. 30, 1998

(51) Int. Cl.[7] ............................................. G06F 17/00
(52) U.S. Cl. ........................ 718/1; 713/164; 713/165; 713/166; 713/167; 713/200; 712/202; 718/100
(58) Field of Search ............................. 713/164–167, 713/200; 717/147–148, 7; 712/202, 245; 718/1, 100; 709/200–253, 102–106

(56) References Cited

U.S. PATENT DOCUMENTS

| | | | | |
|---|---|---|---|---|
| 5,754,855 A | * | 5/1998 | Miller et al. | 709/106 |
| 5,848,423 A | * | 12/1998 | Ebrahim et al. | 707/206 |
| 5,987,608 A | * | 11/1999 | Roskind | 713/200 |
| 6,009,517 A | * | 12/1999 | Bak et al. | 712/245 |
| 6,192,476 B1 | * | 2/2001 | Gong | 713/201 |
| 6,226,789 B1 | * | 5/2001 | Tye et al. | 717/7 |
| 6,308,274 B1 | * | 10/2001 | Swift | 713/201 |
| 6,493,816 B1 | * | 12/2002 | Munroe et al. | 711/209 |

OTHER PUBLICATIONS

Wallach et al. "Extebsible Security Architectures for Java" Department of Computer Science Princeton University Oct. 1997 pp. 116–128.*
Http://developer.netscape.com/docs/manuals/signedobj/capabilities/contents.htm "Introduction to the Capailities Classes" Aug. 97 pp. 1–15.*

* cited by examiner

*Primary Examiner*—Meng-Al T. An
*Assistant Examiner*—Charles Anya
(74) *Attorney, Agent, or Firm*—Duke W. Yee; Jeffrey S. LaBaw; Wayne P. Bailey

(57) ABSTRACT

The Java Virtual Machine (JVM) can be decoupled from its Java-enabled browser. To maintain access to certain system resources (a "privilege") by applets, each Java thread that enables the privilege will now create an entry that describes the privilege in a linked list based on the stack frame address. Sufficient information is stored in the link list for validation purposes. Further, system classes that require specific privileges will have them implicitly granted by an implicit privilege list.

18 Claims, 5 Drawing Sheets

METHOD AND APPARATUS TO RETAIN APPLET SECURITY PRIVILEGES OUTSIDE OF THE JAVA VIRTUAL MACHINE

BACKGROUND OF THE INVENTION

1. Technical Field

The present invention relates to a system for decoupling a java virtual machine (JVM) from a browser. Specifically, the invention relates to a system to retain applet security privileges outside of the JVM, thereby allowing internet browser decoupling from the JVM.

2. Description of Related Art

The Internet, also referred to as an "internetwork", in communications is a set of computer networks, possibly dissimilar, joined together by means of gateways that handle data transfer and the conversion of messages from the sending network to the protocols used by the receiving network (with packets if necessary). When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Operating costs may be reduced by providing informational guides and/or searchable databases of public records online.

Currently, the most commonly employed method of transferring data over the Internet is to employ the World Wide Web environment, also called simply "the web". Other Internet resources exist for transferring information, such as File Transfer Protocol (FTP) and Gopher, but have not achieved the popularity of the web. In the web environment, servers and clients effect data transaction using the Hypertext Transfer Protocol (HTTP), a known protocol for handling the transfer of various data files (e.g., text, still graphic images, audio, motion video, etc.). Information is formatted for presentation to a user by a standard page description language, the Hypertext Markup Language (HTML). In addition to basic presentation formatting, HTML allows developers to specify "links" to other web resources identified by a Uniform Resource Locator (URL). A URL is a special syntax identifier defining a communications path to specific information. Each logical block of information accessible to a client, called a "page" or a "web page", is identified by a URL. The URL provides a universal, consistent method for finding and accessing this information by the web "browser". A browser is a program capable of submitting a request for information identified by a URL at the client machine. Retrieval of information on the web is generally accomplished with an HTML-compatible browser.

When a user desires to retrieve a page, a request is submitted to a server connected to a client computer at which the user is located and may be handled by a series of servers to effect retrieval of the requested information. The information is provided to the client formatted according to HTML. Typically, personal computers (PCs) along with work stations are typically used to access the Internet.

Often applications or programs may be sent to a computer from a web server across the Internet. Java applications are becoming increasingly more prevalent as the type of application sent between web servers and client computers. Java applications are common on the Internet and becoming more increasingly common in intranets and in other types of networks used in businesses.

Java is an object oriented programming language and environment focusing on defining data as objects and the methods that may be applied to those objects. Java supports only a single inheritance, meaning that each class can inherit from only one other class at any given time. Java also allows for the creation of totally abstract classes known as interfaces, which allow the defining of methods that may be shared with several classes without regard for how other classes are handling the methods.

The Java virtual machine (JVM) is a virtual computer component that resides only in memory. The JVM allows Java programs to be executed on a different platform as opposed to only the one platform for which the code was compiled. Java programs are compiled for the JVM. In this manner, Java is able to support applications for many types of data processing systems, which may contain a variety of central processing units and operating systems architectures. To enable a Java application to execute on different types of data processing systems, a compiler typically generates an architecture-neutral file format—the compiled code is executable on many processors, given the presence of the Java run-time system. The Java compiler generates bytecode instructions that are non-specific to a particular computer architecture. A bytecode is a machine independent code generated by the Java compiler and executed by a Java interpreter. A Java interpreter is a part in the JVM that alternately decodes and interprets a bytecode or bytecodes. These bytecode instructions are designed to be easy to interpret on any computer and easily translated on the fly into native machine code.

Many currently available web browsers, such as Netscape Communicator, which is available from Netscape Communications Corporation, incorporate fixed, embedded JVMs in which the browsers pass fixed options to the JVM. Presently, however, JVMs updates are provided more often than web browser updates. Such a situation prevents users from taking advantage of improved versions of JVMs until the web browser is updated. Therefore, it would be advantageous to have an improved method and apparatus for providing users an ability to use more recent versions of JVMs without having to wait for an updated version of the web browser. Specifically, a fixed JVM within the browser limits the flexibility of developers and users of Java applets within the browser. "Applets" are mini applications that typically run inside a Java-enabled browser.

Netscape implements a proprietary Java security scheme within their browser (and JVM). Applets can request, and subsequently be granted certain privileges, such as being able to read or write to the local hard drive. These privileges, when granted, are stored in the JVM's call stack frame which corresponds to the method which has been granted access. These privileges remain in effect until the method (function) which requested it goes out of scope. In other words, when the function is popped from the call stack. These privileges are also removed when a user explicitly reverts the privilege.

The implementation of storing privileges on the JVM's stack frame requires JVM modifications for its implementation, since the stack frame data structure is internal to the JVM. This implementation prevents the usage of a de-integrated JVM. Netscape has also changed many system Java classes to explicitly code enable Privilege/revert Privilege calls. By doing so, a copy of a Java source file for a given level of Java is modified with these calls to enable or revert privileges. This locks the browser into a particular level of Java source.

Therefore, a need exists for a method of decoupling the JVM from the browser. Once decoupled, a more up-to-date version of the JVM can be utilized. However, applet security privileges must be retained outside of the JVM by such a system.

SUMMARY OF THE INVENTION

The present invention addresses the need to decouple the JVM from the browser while retaining applet security privileges. Each Java thread that enables a privilege will now create an entry that describes the privilege in a linked list based on the stack frame address. Sufficient information is stored in the link list entry for validation purposes, to guard against the case where a function that was granted privilege has since returned and the same stack frame is being reused by another function which should not have privilege. The information that is kept is the method name and signature (parameter list) of the function requesting the privilege, as well as the calling function's return address (instruction pointer). When a query is done to determine if the applet has the required privilege, the linked list for its thread will be searched and the privilege (if found and valid) will be returned. Privileges are reverted by removing the element from the linked list.

System Java classes also no longer need to be modified with enable/revert privilege calls. Instead, system classes that require specific privileges will have them implicitly granted. An implicit privilege list is created in memory. The implicit privilege list can map system classes, functions within them that require privileges, and the privileges that are needed. When a request is made to determine if a function has the required privilege, the linked list of privileges will first be checked. If no privilege is found, a subsequent search of the implicit privilege list will determine whether the requesting function is allowed access to the resource. This apparatus can also be used in future implementations for storing additional Java stack frame-based information.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
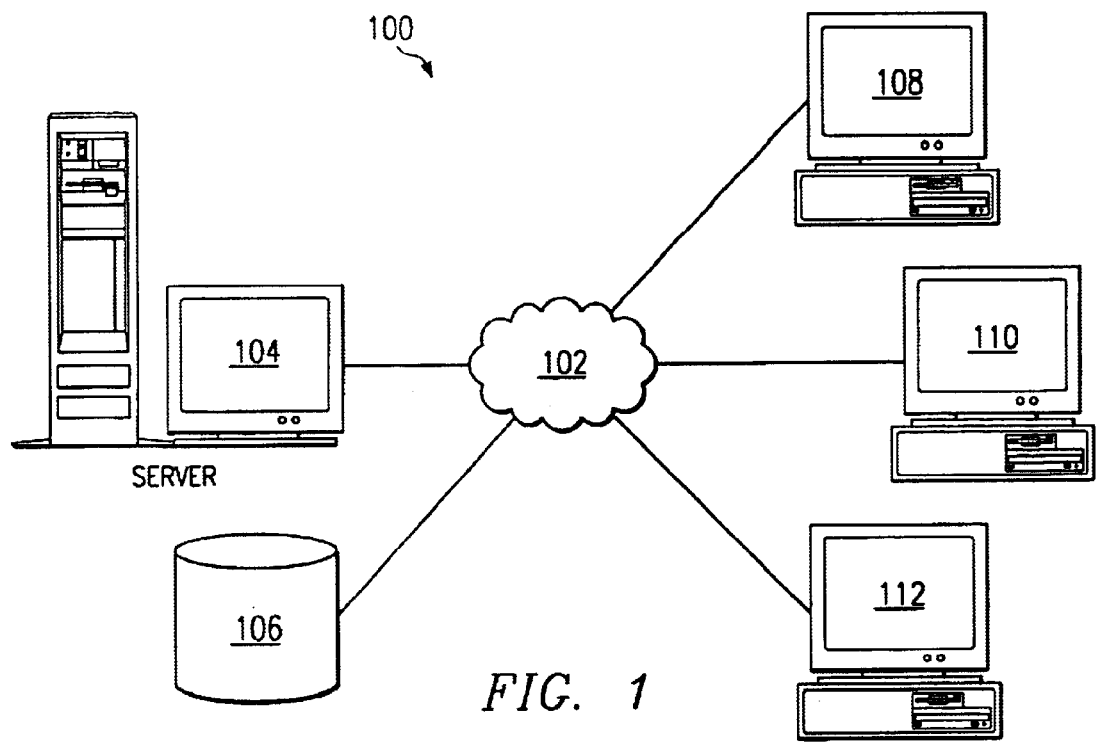
FIG. 1 is a pictorial representation of a distributed data processing system in which the present invention may be implemented.

With reference now to the figures, and in particular with reference to FIG. 1, a pictorial representation of a distributed data processing system in which the present invention may be implemented is depicted.

Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers of network computers. For purposes of this application, a network computer is any computer, coupled to a network, which receives a program or other application from another computer coupled to the network. In the depicted example, server 104 provides data, such as boot files, operating system images, and applications to NCs 108–112. NCs -108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational, and other computer systems, that route data and messages. Of course, distributed data processing system 100 also may be implemented as an umber of different types of networks, such as for example, an intranet or a local area network.

FIG. 1 is intended as an example, and not as an architectural limitation for the processes of the present invention.

Figure 2:
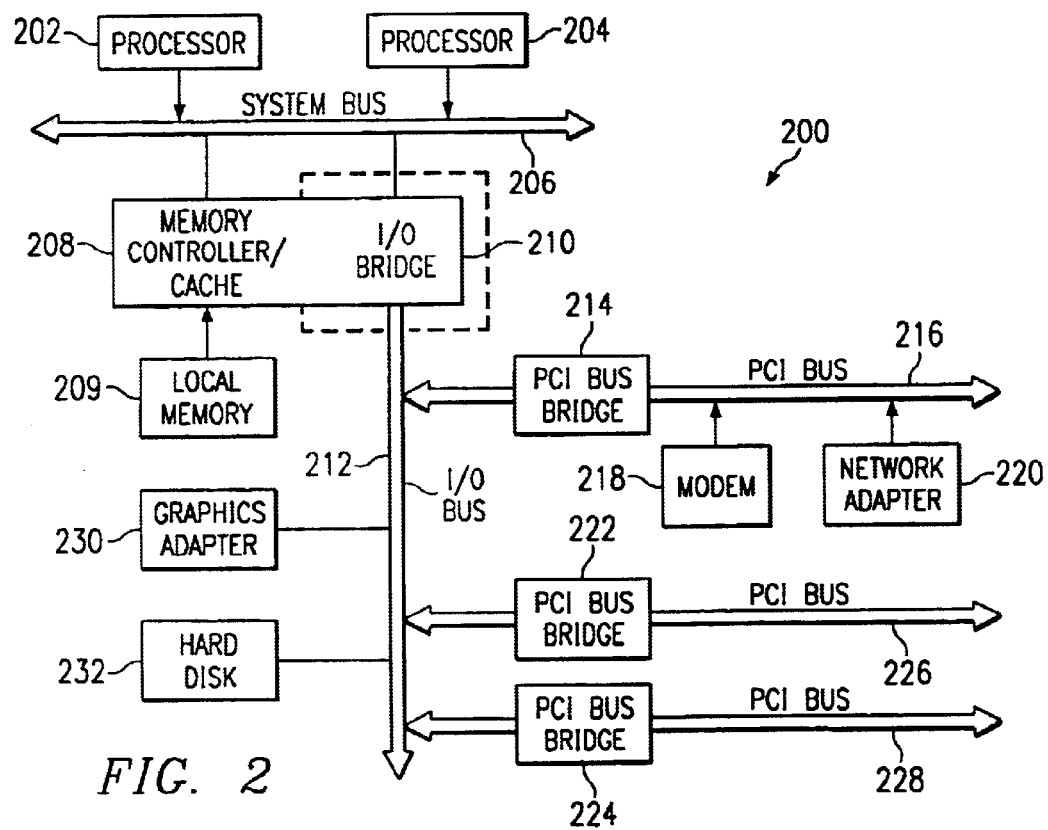
FIG. 2 is a block diagram of a data processing system that may be implemented as a server.

Referring to FIG. 2, a block diagram of a data processing system which may be implemented as a server, such as server 104 in FIG. 1, is depicted in accordance to the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 218–220 may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drive and the like also may be used in addition or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
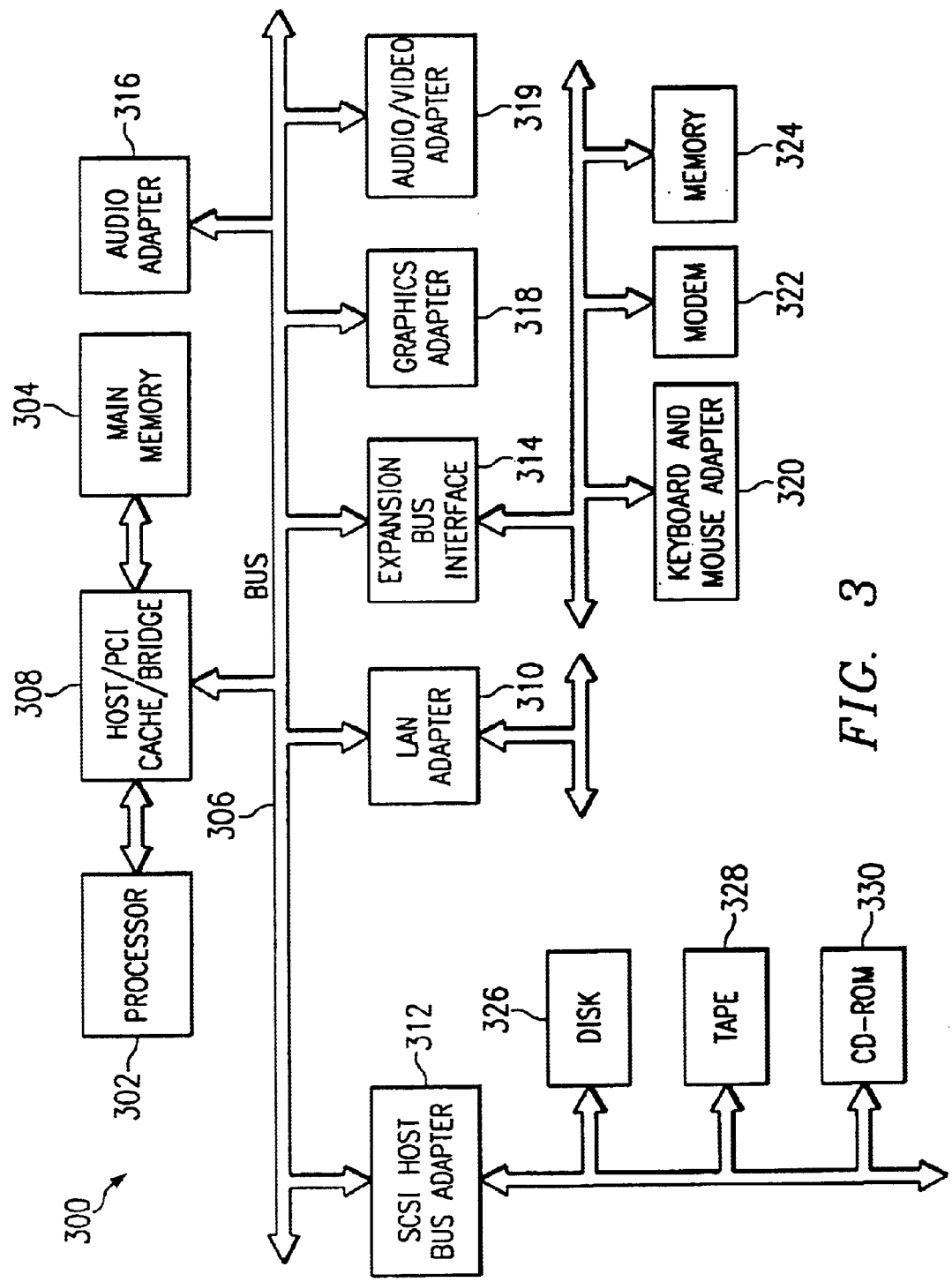
FIG. 3 is a block diagram of a data processing system in which the present invention may be implemented.

With reference now to FIG. 3, a block diagram of a data processing system 300 in which the present invention may be implemented is illustrated. Data processing system 300 is an example of a client computer. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. SCSI host bus adapter 112 provides a connection for hard disk drive 326, tape drive 328, and CD-ROM 330 in the depicted example. Typical PCI local bus implementations will support three or four PCI expansion slots or add-in connectors.

An operating system runs on processor 302 and is used to coordinate and provide control of various components within data processing system 300 in FIG. 1. The operating system may be a commercially available operating system such as OS/2, which is available from International Business Machines Corporation. "OS/2" is a trademark of from International Business Machines Corporation. An object oriented programming system such as Java may run in conjunction with the operating system and provides calls to the operating system from Java programs or applications executing on data processing system 300. Instructions for the operating system, the object-oriented operating system, and applications or programs are located on storage devices, such as hard disk drive 326 and may be loaded into main memory 304 for execution by processor 302.

Those of ordinary skill in the art will appreciate that the hardware in FIG. 3 may vary depending on the implementation. For example, other peripheral devices, such as optical disk drives and the like may be used in addition to or in place of the hardware depicted in FIG. 3. The depicted example is not meant to imply architectural limitations with respect to the present invention. For example, the processes of the present invention may be applied to multiprocessor data processing system.

Figure 4:
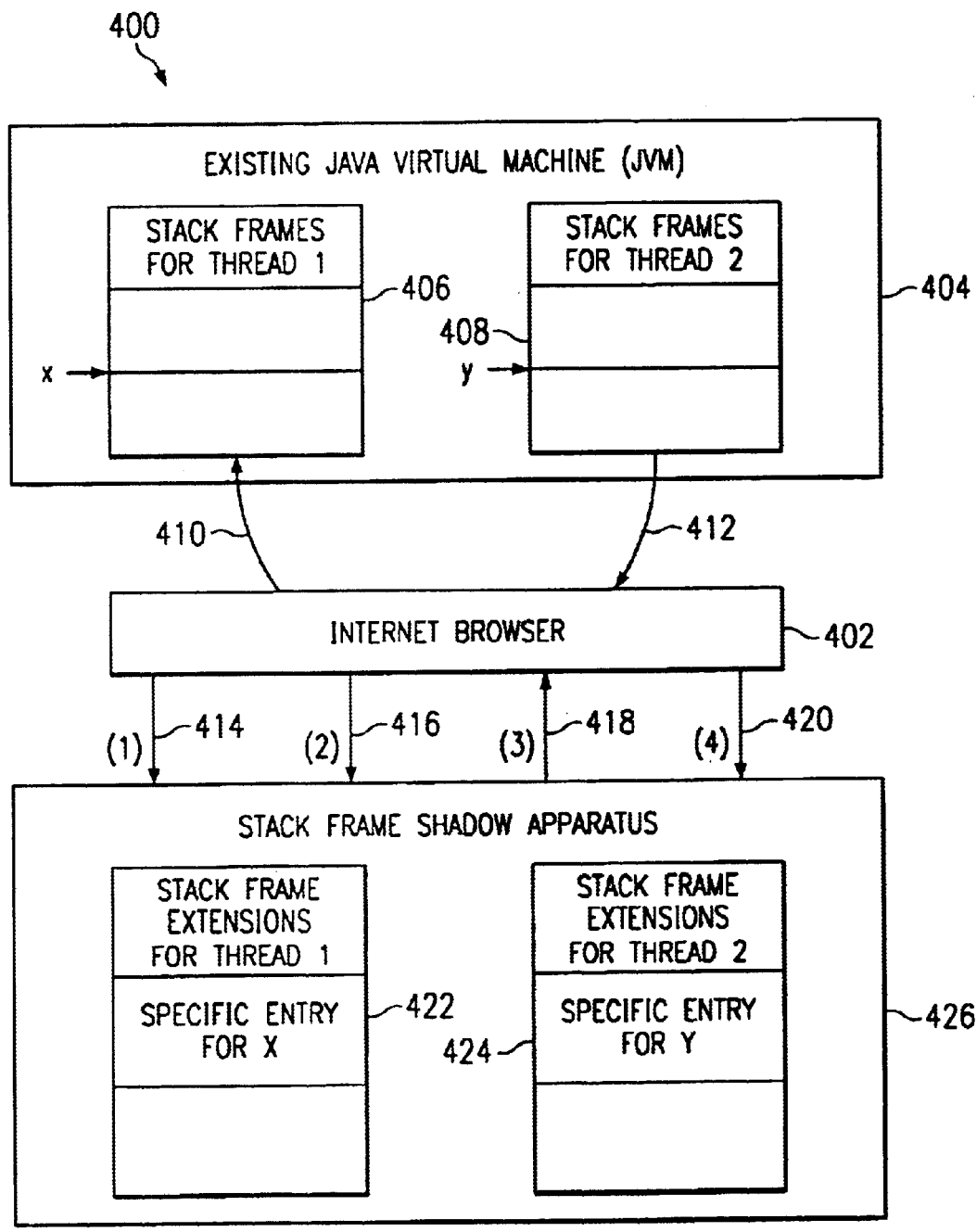
FIG. 4 is a block diagram illustrating the stack frame shadow apparatus used in the implementation of the present invention.

FIG. 4 is a block diagram illustrating the relationship between the JVM and the browser and also illustrating the basic steps for creating the linked list. The system 400 includes a browser 402. The browser can incorporate or interact with an existing JVM 404. The existing JVM includes a stack frame for a first thread 406 and a stack frame for a second thread 408. As mentioned above, privileges are stored in the stack frames. Each stack can contain a plurality of frames such as those designated by the x and y arrows. Under normal operation, the internet browser 402 queries the existing JVM 404 to get a stack frame (step 410). In response, the existing JVM returns the appropriate stack frame (step 412). The present invention involves the creation of a stack frame shadow apparatus 426. The creation of the stack frame shadow apparatus involves setting the stack frame extension using the thread identifier and frame (step 414). Then, when the browser needs to know if a privilege is available, the stack frame shadow apparatus 426 is queried to get the frame extension by thread identifier and frame (step 416). The frame extension is returned (step 418) and then the frame extension can be removed from the stack frame shadow apparatus (step 420). Several of these steps will be discussed below in greater detail. Within the stack frame shadow apparatus 426 are stack frame extensions for first thread 422 and for the second thread 424.

Figure 5:
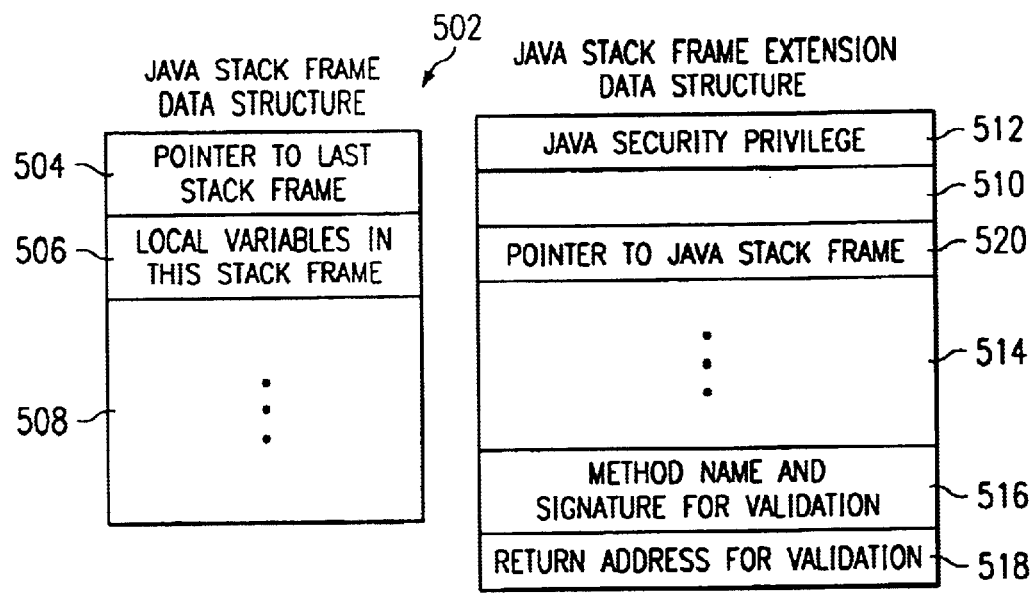
FIG. 5 is a block diagram illustrating the Java stack frame data structure and the Java stack frame extension data structure.

FIG. 5 provides a comparison between the Java stack frame data structure 502 and the Java stack frame extension data structure 510 in the stack frame shadow apparatus 426 of FIG. 4. The Java stack frame data structure 502 includes the pointer to the last stack frame 504, the local variables in this stack frame 506, and other information 508. The Java stack frame extension data structure 510 can include the Java security privilege 512, other variables 514, the method name and signature for validation 516, and the return address for validation 518. The pointer to the Java stack frame 520 is used to map this extension entry with the JVM's stack frame 508.

Figure 6:
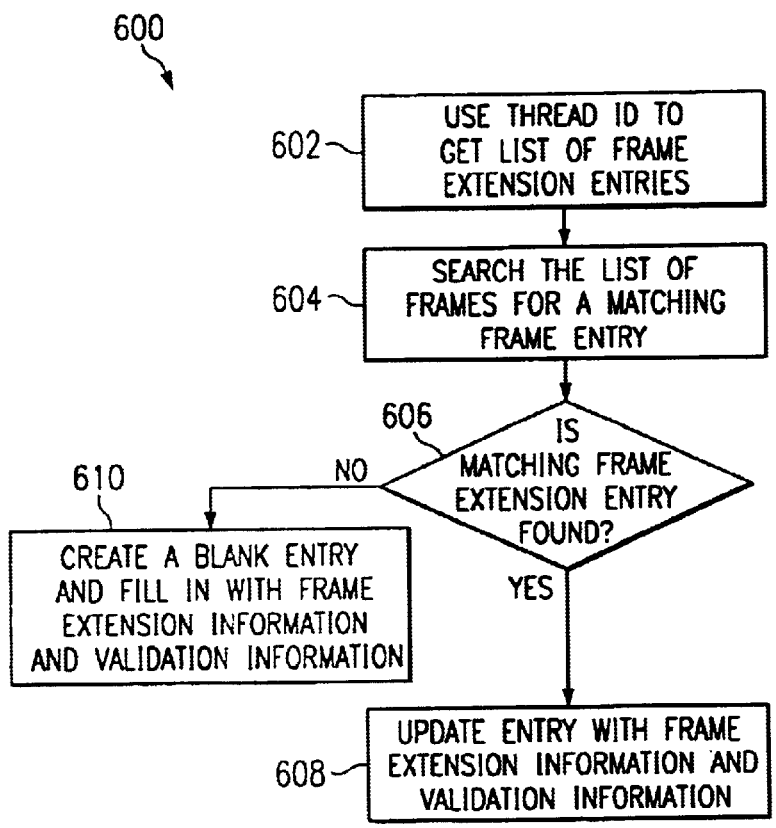
FIG. 6 is a flow chart of the method of setting a Java stack frame extension in the apparatus of FIG. 4.

FIG. 6 is a flow chart of the method 600 of setting Java stack frame extension in the apparatus. First, the system must use the thread identifier to get a list of frame extension entries (step 602). Next, the system searches for the list of frames for matching frame entry(ies) (step 604). Next, the system decides whether a matching frame extension entry has been found (step 606). If yes, then the system will update the entry with the frame extension information and validation information (step 608). If not, then the system will create a blank entry and fill the blank entry in with frame extension information and validation information (step 610).

Figure 7:
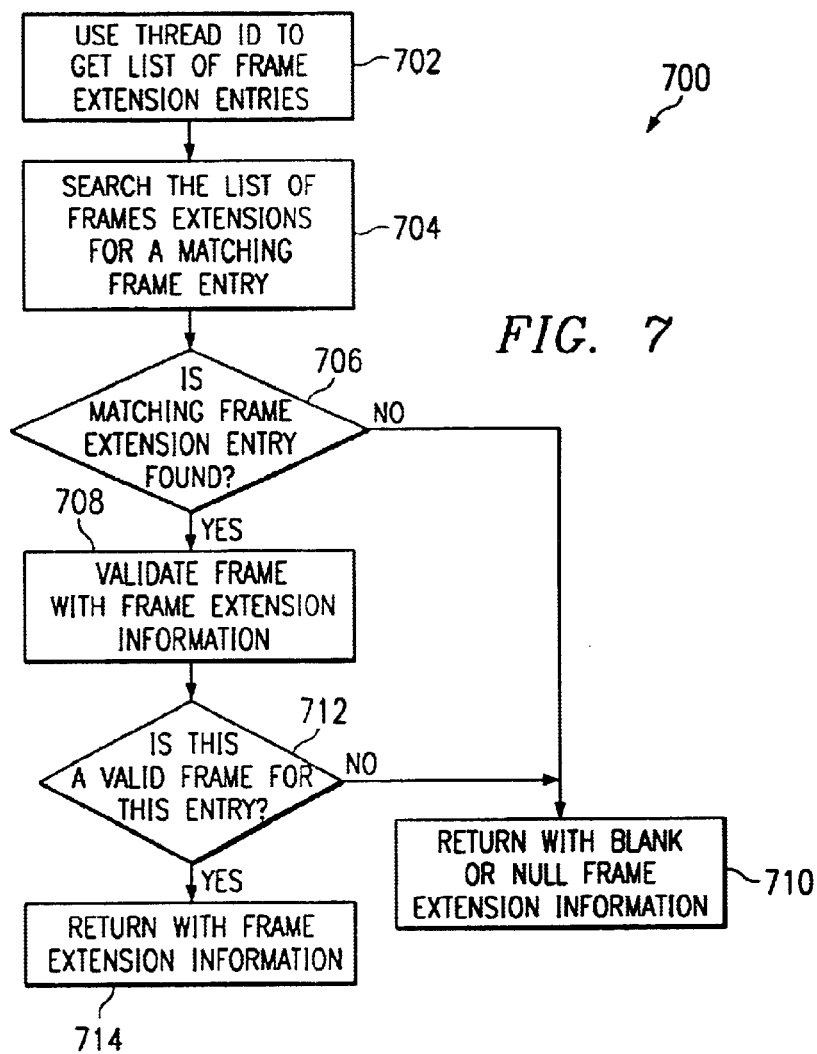
FIG. 7 is a flow chart of the method of querying to get a Java stack frame extension in the apparatus.

FIG. 7 is a flow chart of the method 700 of getting a Java stack frame extension located in the shadow apparatus 426. The system first uses the thread identifier to get a list of frame extension entries (step 702). Next, the system searches the list of frame extensions for a matching frame entry (step 704). Next, the system decides whether a matching frame extension is found (step 706). If so, the system must validate the frame with frame extension information (step 708). If not, the system returns with a blank or null frame extension information (step 710). Once step 708 is completed, the system further decides whether the frame is valid for the particular entry (step 712). If not, the system returns to step 710. If however, the frame is valid in step 712, then the system returns with the frame extension information (step 714).

Figure 8:
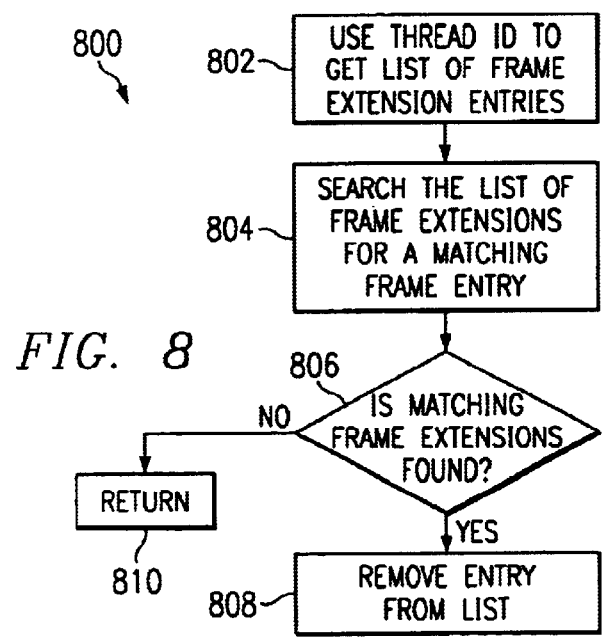
FIG. 8 is a flow chart of the method for removing a Java stack frame extension in the apparatus.

FIG. 8 illustrates the method 800 of removing the Java stack frame extension in the shadow apparatus 426. First, the system uses a thread identifier to get a list of frame extension entries (step 802). Next, the system searches the list of frame extensions for a matching frame entry (step 804). If a matching frame extension is found (step 806), then the entry is removed from the list (step 808). If no match is found, then the system returns (step 810) to the caller to revert privilege.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media such as a floppy disc, a hard disk drive, a RAM, and CD-ROMs and transmission-type media such as digital and analog communications links.

The description of the present invention has been presented for purposes of illustration and description, but is not limited to be exhaustive or limited to the invention in the form disclosed. Many modifications and variations will be apparent to those of ordinary skill in the art. The embodiment was chosen and described in order to best explain the principles of the invention the practical application and to enable others of ordinary skill in the art to understand the invention for various embodiments with various modifications as are suited to the particular use contemplated.

What is claimed is:

1. A process for providing a security privilege for a method of a current thread that is currently executing in a run-time environment in a data processing system, the run-time environment having a stack comprising stack frames with stack frame pointers for associated methods, the process comprising the computer-implemented steps of:

using a thread identifier of the current thread, locating a linked list;

searching the linked list for an entry having a stack frame pointer that matches the stack frame pointer of the method, wherein an entry of the linked list is a stack frame extension comprising security privilege information for the method; and retrieving the security privilege information for a matching entry from the linked list if a matching entry is found in response to a request to retrieve privileges for the method.

2. The process of claim 1, wherein the step of locating a linked list further comprises:

locating the linked list within a stack frame shadow apparatus comprising a plurality of linked lists, each linked list of the plurality of linked lists being associated with a thread.

3. The process of claim 1 wherein the stack frame extension further comprises the stack frame pointer of the method and validation information.

4. The process of claim 3 wherein the validation information comprises the name of the method, the signature of the method, and the return address of the method.

5. The process of claim 1, further comprising:

adding an entry to the linked list if no matching entries are found in response to a request to enable a privilege for the method.

6. A process for providing a privilege for a method of a current thread that is currently executing in a run-time environment in a data processing system, the run-time environment having a stack comprising stack frames with stack frame pointers for associated methods, the process comprising the computer-implemented steps of:

using a thread identifier of the current thread, locating a linked list; searching the linked list for an entry having a stack frame pointer that matches the stack frame pointer of the method, wherein an entry of the linked list is a stack frame extension; and removing a matching entry from the linked list if a matching entry is found in response to a request to revert a privilege for the method.

7. A process for providing a privilege for a method of a current thread that is currently executing in a run-time environment in a data processing system, the run-time environment having a stack comprising stack frames with stack frame pointers for associated methods, the process comprising the computer-implemented steps of:

using a thread identifier of the current thread, locating a linked list;

searching the linked list for an entry having a stack frame pointer that matches the stack frame pointer of the method, wherein an entry of the linked list is a stack frame extension; and retrieving privilege information and validation information for a matching entry from the linked list if a matching entry is found in response to a request to retrieve privileges for the method.

8. A process for enabling and reverting a privilege for a method of a current thread that is currently executing in a run-time environment in a data processing system, the run-time environment having a stack comprising stack frames with stack frame pointers for associated methods, the process comprising the computer-implemented steps of:

storing privilege information in a stack frame shadow apparatus to enable a privilege for a method;

querying a stack frame shadow apparatus for privilege information for a method; and deleting privilege information in a stack frame shadow apparatus to revert a privilege for a method.

9. A data structure on a computer-readable medium for use in a data processing system, the data structure comprising:

a set of stack frame extensions, wherein a stack frame extension comprises:
   a pointer to a stack frame for a method;
   a data field for privilege data for the method;
   a data field for validation data for the method;
   a linked list of stack frame extension entries, wherein the linked list is identifiable by a thread identifier.

10. A data processing system for providing a security privilege for a method of a current thread that is currently executing in a run-time environment in the data processing system, the run-time environment having a stack comprising stack frames with stack frame pointers for associated methods, the data processing system comprising:

locating means for locating a linked list using a thread identifier of the current thread;

searching means for searching the linked list for an entry having a stack frame pointer that matches the stack frame pointer of the method, wherein an entry of the linked list is a stack frame extension comprising security privilege information for the method; and retrieving means for retrieving the security privilege information for a matching entry from the linked list if a matching entry is found in response to a request to retrieve privileges for the method.

11. The data processing system of claim 10 further comprising:

a stack frame shadow apparatus comprising a plurality of linked lists, each linked list of the plurality of linked lists being associated with a thread.

12. The data processing system of claim 10 wherein the stack frame extension further comprises the stack frame pointer of the method and validation information.

13. The data processing system of claim 12 wherein the validation information comprises the name of the method, the signature of the method, and the return address of the method.

14. The data processing system of claim 10 further comprising:

adding means for adding an entry to the linked list if no matching entries are found in response to a request to enable a privilege for the method.

15. A data processing system for providing a privilege for a method of a current thread that is currently executing in a run-time environment in the data processing system, the run-time environment having a stack comprising stack frames with stack frame pointers for associated methods, the data processing system comprising:

locating means for locating a linked list using a thread identifier of the current thread;

searching means for searching the linked list for an entry having a stack frame pointer that matches the stack frame pointer of the method, wherein an entry of the linked list is a stack frame extension; and removing means for removing a matching entry from the linked list if a matching entry is found in response to a request to revert a privilege for the method.

16. A data processing system for providing a privilege for a method of a current thread that is currently executing in a run-time environment in the data processing system, the run-time environment having a stack comprising stack frames with stack frame pointers for associated methods, the data processing system comprising:

locating means for locating a linked list using a thread identifier of the current thread;

searching means for searching the linked list for an entry having a stack frame pointer that matches the stack frame pointer of the method, wherein an entry of the linked list is a stack frame extension; and retrieving means for retrieving privilege information and validation information for a matching entry from the linked list if a matching entry is found in response to a request to retrieve privileges for the method.

17. A computer program product for use in a data processing system for providing a security privilege for a method of a current thread that is currently executing in a run-time environment in the data processing system, the run-time environment having a stack comprising stack frames with stack frame pointers for associated methods, the computer program product comprising:

first instructions for locating a linked list using a thread identifier of the current thread;

second instructions for searching the linked list for an entry having a stack frame pointer that matches the stack frame pointer of the method, wherein an entry of the linked list is a stack frame extension comprising security privilege information for the method; and third instructions for retrieving the security privilege information for a matching entry from the linked list if a matching entry is found in response to a request to retrieve privileges for the method.

18. The data structure of claim 9, wherein the privilege data for the method is security privilege data for the method.

* * * * *